Patented May 4, 1943

2,318,426

UNITED STATES PATENT OFFICE 2,318,426

METHOD OF CANNING GREEN VEGETABLES

Walter L. Schroder, Hortonville, and Thomas A. Rogers, Stevens Point, Wis.

No Drawing. Application October 5, 1940, Serial No. 359,906

11 Claims. (Cl. 99—186)

The present invention relates to the canning of vegetables, and more particularly to a treatment of peas, spinach and other green vegetables for preserving their natural color and flavor.

It is generally recognized that the loss of color and flavor in canned green peas and other green vegetables is caused by an acid condition developed during the canning operations, the heat applied during these operations liberating volatile and non-volatile acids which attack and destroy the chlorophyll or green coloring matter of the vegetables.

It is an object of the present invention to provide an improved method of treating peas and other green vegetables which will prevent an increase in the acidity of the vegetables during canning and thus avoid undesired changes in the color and flavor of the vegetables, while further avoiding loss of texture and the use of excessively high sterilizing temperatures.

Another object of the invention is to provide an improved method of treating the vegetables in which they are subjected to a blanch solution of an alkaline reagent having magnesium as the cation and then to a blanch solution of an alkaline reagent having calcium as the cation.

A further object is to facilitate the removal of acid and other gases from the vegetables and the penetration of the alkaline reagents.

This application constitutes a continuation in part of our copending application Serial No. 284,784, filed July 15, 1939, for "Method of canning green vegetables."

By way of example, the method of the invention will be described in connection with the canning of green peas.

In carrying out the method, the peas to be canned are first washed, as usual, in cool water, the wash water being generally at room temperature.

The washed peas are then subjected to successive blanching operations in which certain alkaline reagents are used in the blanch water. In the first blanching stage the alkaline reagent contains magnesium as a cation, while in the second blanching stage, the reagent contains calcium as a cation. The alkaline reagent used in the first blanching stage is preferably magnesium hydroxide, obtained as by adding sufficient magnesium oxide to the blanch water to produce a saturated solution, any excess of reagent remaining in suspension. In some cases, the same reagent is also used in the washing operation preceding the blanch. In the second blanching stage, the alkaline reagent is preferably in the form of calcium hydroxide, obtained as by adding sufficient calcium oxide to the blanch water to produce a saturated solution, any excess of reagent remaining in suspension. In some instances, magnesium and calcium carbonates may be used in the respective blanch solutions instead of, or in addition to, the corresponding hydroxides.

When the conventional plain water blanch is used for peas, various desirable effects are obtained, such as the removal of the outer mucous coating of the peas, softening of the peas, and imparting an even and uniform color to the peas. In the first blanching stage of the method of the present invention additional advantageous effects are obtained; namely, the magnesium-containing base acts as a buffer to minimize loss of magnesium from the chlorophyll, and volatile and other acids are neutralized as they are liberated. In this way there is produced a condition of high magnesium concentration and reduced hydrogen ion concentration.

In many instances a further improvement can be obtained by subjecting the blanching chamber or compartment to a mechanically produced partial vacuum, say five to ten pounds absolute pressure, which aids in exhausting the volatile acid gases and other gases and which facilitates the destruction of bacteria. The vacuum also has the effect of facilitating the penetration of the alkaline reagent into the peas so that they will become thoroughly permeated.

After the vacuum treatment, it is advantageous in some cases to apply pressure to the blanching chamber, thus aiding the penetration of the alkaline solution. This is preferably effected by applying steam under a suitable pressure, say five to ten pounds, directly to the blanching chamber, the steam further having a heating effect and forming a carrier for any evolved gases.

The use of magnesium hydroxide (or oxide) is advantageous in the first blanching stage as it is here that most of the volatile acids are evolved, and this reagent prevents the loss of magnesium from the peas. At the same time, this reagent has a limited solubility, while still providing a solution of sufficient alkalinity to control the hydrogen ion concentration.

The calcium hydroxide used in the second blanching stage has a toughening or hardening effect on the pea fibers so as to avoid or minimize any further change in texture or structure. This reagent also provides a sufficient alkaline content in the peas to neutralize any acids evolved at this stage and subsequently, and further acts to avoid loss of green color. In some instances it is desirable to subject the peas to a vacuum treatment and a pressure treatment, as in the first blanching stage.

In each blanching stage the peas are subjected to a suitable blanching temperature, say 170° to 190° F., for a suitable period, say five to fifteen minutes. The peas are preferably given a short rinse in warm or hot water after the first blanching stage so as to remove any loose pieces of material and any surface deposit of alkaline reagent. After the second blanching stage the peas are similarly rinsed.

After the blanching operations, the peas are drained and placed in cans and a suitable brine is added, preferably of the usual sugar-salt type. The hot filled cans are then heated, as by directly applied steam under pressure, and are conducted to a closing or sealing machine, after which the peas are cooked or processed in the usual manner to effect sterilization. In some cases, the cans are subjected to a vacuum immediately before or coincident with closing. Immediately before closing a small quantity of sodium bicarbonate (or potassium bicarbonate) in the form of a pellet is added to each can. In the case of a 20 ounce can each pellet contains about 10 to 15 grains of the bicarbonate. This neutralizing material serves to reduce to a minimum any change in pH value during the final cooking or processing step.

The pH value of the peas after cooking will lie in the range of 6.8 to 7.2 and preferably in the middle part of this range. It is not desirable to have a greater pH value for the final product because of an unfavorable effect on the texture and vitamin content and because of difficulty of sterilization.

As the peas have a natural mineral content which includes magnesium, calcium, sodium and potassium, the treatment of the peas with the alkaline reagents above described avoids the introduction of foreign elements into the peas.

What we claim as new and desire to secure by Letters Patent is:

1. The method of treating green vegetables for canning, which consists in subjecting the vegetables to a solution containing an alkaline reagent in which magnesium is the cation, and then subjecting the vegetables to a solution containing an alkaline reagent in which calcium is the cation.

2. The method of treating green vegetables for canning, which consists in subjecting the vegetables to a solution containing an alkaline reagent in which magnesium is the cation, and then heating the vegetables in a solution containing an alkaline reagent in which calcium is the cation.

3. The method of treating green vegetables for canning, which consists in blanching the vegetables in a solution containing an alkaline reagent in which magnesium is the cation, and then in a solution containing an alkaline reagent in which calcium is the cation.

4. The method of treating green vegetables for canning, which consists in blanching the vegetables in a solution of magnesium hydroxide, and then in a solution of calcium hydroxide.

5. The method of treating green vegetables for canning, which consists in blanching the vegetables in a solution containing an alkaline reagent in which magnesium is the cation, rinsing the blanched vegetables, and then further blanching the vegetables in a solution containing an alkaline reagent in which calcium is the cation.

6. The method of treating green vegetables for canning which consists in blanching the vegetables in a solution containing an alkaline reagent in which magnesium is the cation and then in a solution containing an alkaline reagent in which calcium is the cation, and subjecting the vegetables during the blanching to a vacuum to remove acid gases and to facilitate the penetration of the solution into the vegetables.

7. The method of treating green vegetables for canning which consists in blanching the vegetables in a solution containing an alkaline reagent in which magnesium is the cation and then in a solution containing an alkaline reagent in which calcium is the cation, subjecting the vegetables during the blanching to a vacuum to remove acid gases and to facilitate the penetration of the solution into the vegetables, and thereafter subjecting the vegetables during the blanching to pressure to further aid the penetration of the solution.

8. The method of treating green vegetables for canning, which consists in blanching the vegetables in a solution containing an alkaline reagent in which magnesium is the cation, subjecting the vegetables during the blanching to a vacuum to remove acid gases and to facilitate the penetration of the solution into the vegetables, and further blanching the vegetables in a solution containing an alkaline reagent in which calcium is the cation.

9. The method of canning green vegetables, which consists in blanching the vegetables in a solution containing an alkaline reagent in which magnesium is the cation, further blanching the vegetables in a solution containing an alkaline reagent in which calcium is the cation, adding to the blanched vegetables a salt-sugar brine and an alkaline reagent selected from the class consisting of sodium bicarbonate and potassium bicarbonate, and sterilizing by heat.

10. The method of treating green vegetables for canning, which consists in subjecting the vegetables to a solution containing an alkaline reagent in which magnesium is the cation and then to a solution containing an alkaline reagent in which calcium is the cation, and subjecting the vegetables to pressure to facilitate the penetration of the solution into the vegetables.

11. The method of treating green vegetables for canning, which consists in subjecting the vegetables to a solution containing an alkaline reagent in which magnesium is the cation and then to a solution containing an alkaline reagent in which calcium is the cation, subjecting the vegetables to a vacuum treatment to remove acid gases, and subjecting the vegetables to pressure to facilitate the penetration of the solution into the vegetables.

WALTER L. SCHRODER.
THOMAS A. ROGERS.